(12) United States Patent
Ramachandran et al.

(10) Patent No.: US 12,545,185 B1
(45) Date of Patent: Feb. 10, 2026

(54) EXTERNAL VISUAL IMAGE DEVICE

(71) Applicant: FSVAP USA, INC., Auburn Hills, MI (US)

(72) Inventors: Hari Prasad Ramachandran, Auburn Hills, MI (US); Sundara Gopalakrishnan, Auburn Hills, MI (US)

(73) Assignee: FSVAP USA, INC., Auburn Hills, MI (US)

( * ) Notice: Subject to any disclaimer, the term of this patent is extended or adjusted under 35 U.S.C. 154(b) by 0 days.

(21) Appl. No.: 18/958,237

(22) Filed: Nov. 25, 2024

(51) Int. Cl.
*B60R 1/23* (2022.01)
*H04N 23/51* (2023.01)
*B60S 1/56* (2006.01)

(52) U.S. Cl.
CPC ............... *B60R 1/23* (2022.01); *H04N 23/51* (2023.01); *B60S 1/56* (2013.01)

(58) Field of Classification Search
CPC ........................................................ B60R 1/23
See application file for complete search history.

(56) References Cited

U.S. PATENT DOCUMENTS 10,399,509 B2    9/2019  Byrne
11,794,664 B2   10/2023  Kim

FOREIGN PATENT DOCUMENTS

CN        208001323 U    10/2018
EP          4134280 B1   12/2023

*Primary Examiner* — Y Lee
(74) *Attorney, Agent, or Firm* — Barnes & Thornburg LLP

(57) ABSTRACT

An external visual image device located beneath and within a wheel base of a vehicle includes a mounting bracket coupled to the vehicle, a housing, and a camera. The housing is coupled to the mounting bracket and defines an interior compartment. The camera is coupled to the housing and is arranged to lie within the interior compartment.

16 Claims, 4 Drawing Sheets

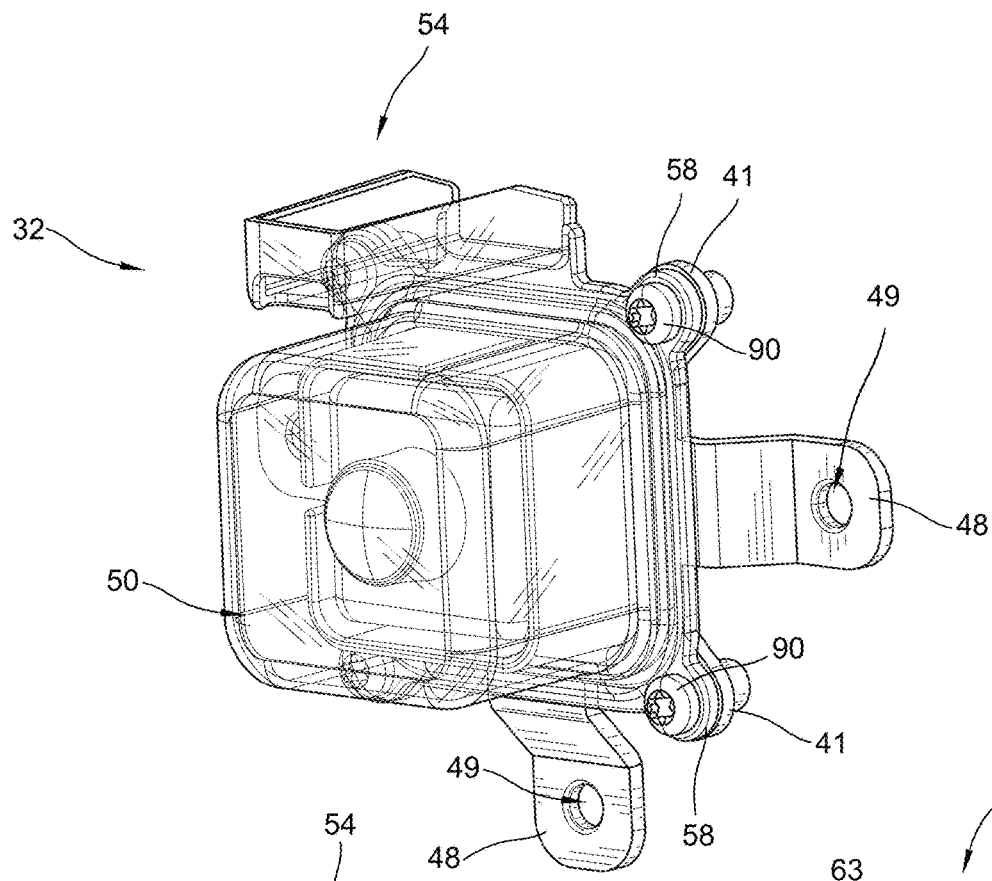
FIG. 6
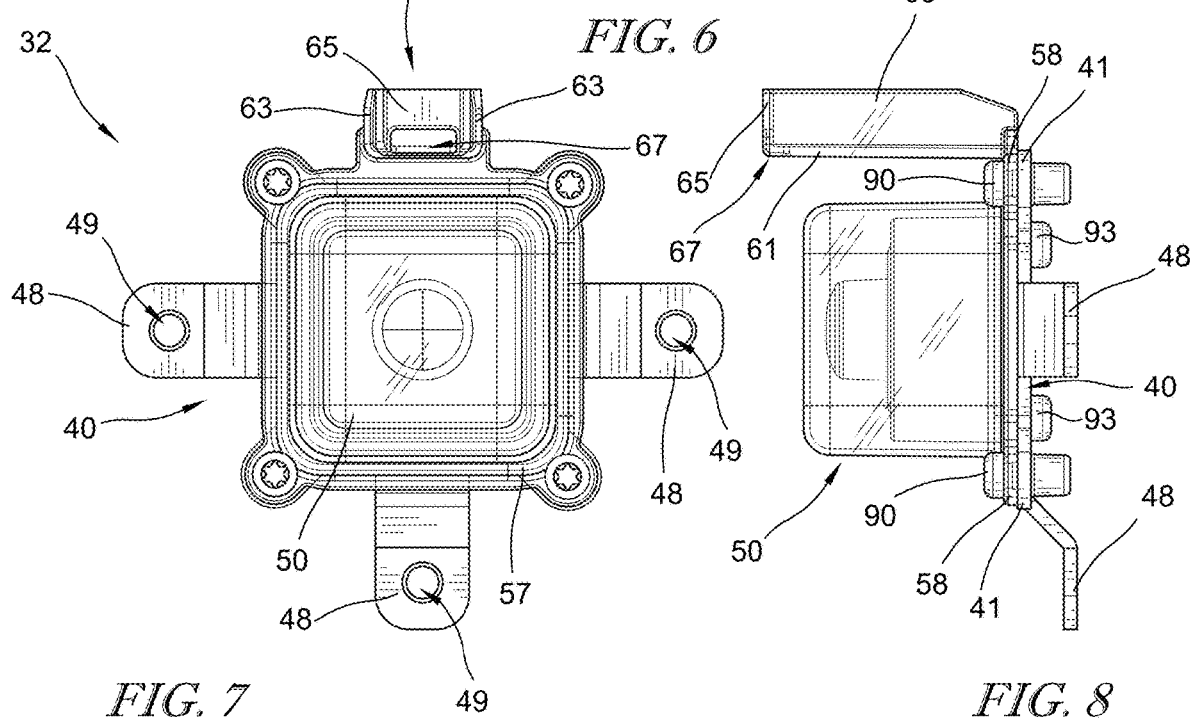
FIG. 7
FIG. 8

EXTERNAL VISUAL IMAGE DEVICE

BACKGROUND

The present disclosure relates to an external visual image device, and particularly to an external visual image device for a vehicle. More particularly, the present disclosure relates to an external visual image device configured to attach to a frame of the vehicle to view objects beneath the vehicle.

SUMMARY

According to the present disclosure, a vehicle includes a vehicle body, a vehicle frame, and a plurality of wheels. The vehicle body defines the cabin of the vehicle and supports one or more occupants and an operator for transport by the vehicle. The vehicle frame is configured to support the vehicle body. The plurality of wheels are coupled to the vehicle frame and support the vehicle body and the vehicle frame above ground to allow the vehicle to travel over the ground.

In illustrative embodiments, an external visual image device is adapted to be coupled to the vehicle to view obstacles under and around the vehicle that may or may not be visible to the operator. The external visual image device is about to be mounted beneath the vehicle body of the vehicle and, in the illustrative embodiments, to lie within a wheel base of the vehicle. The external visual image device may be coupled to one or more vehicle sub-systems such as an electronic control unit (ECU) of the vehicle, a fluid source or reservoir, and/or an air source to provide an external visual image device system for the vehicle.

In illustrative embodiments, the external visual image device is coupled to at least one of the vehicle body and the vehicle frame and includes a housing and a camera. The camera is coupled to the housing and is contained within an interior compartment defined by a base of the housing, the camera sitting between the base and a cover of the housing. The cover is arranged to enclose the interior compartment and cover the camera. The location of the cover may cause the cover to be more prone to damage and stress. Due to the arrangement of the cover and the base, the cover is easily removable and replaceable. The removeable cover also enables the camera to be more easily replaced or serviced, for example, for maintenance.

In illustrative embodiments, the housing is configured to protect the camera from debris, weather, and corrosion/deterioration. The cover is coupled to the base, and the base is coupled to a mounting bracket to couple to the vehicle. The camera is arranged to lie within the interior compartment between the cover and the base. The cover may be removed or disassembled to remove and replace various components of the external visual image device such as the camera or the cover without having to remove the base of the housing from the vehicle.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

Figure 3:
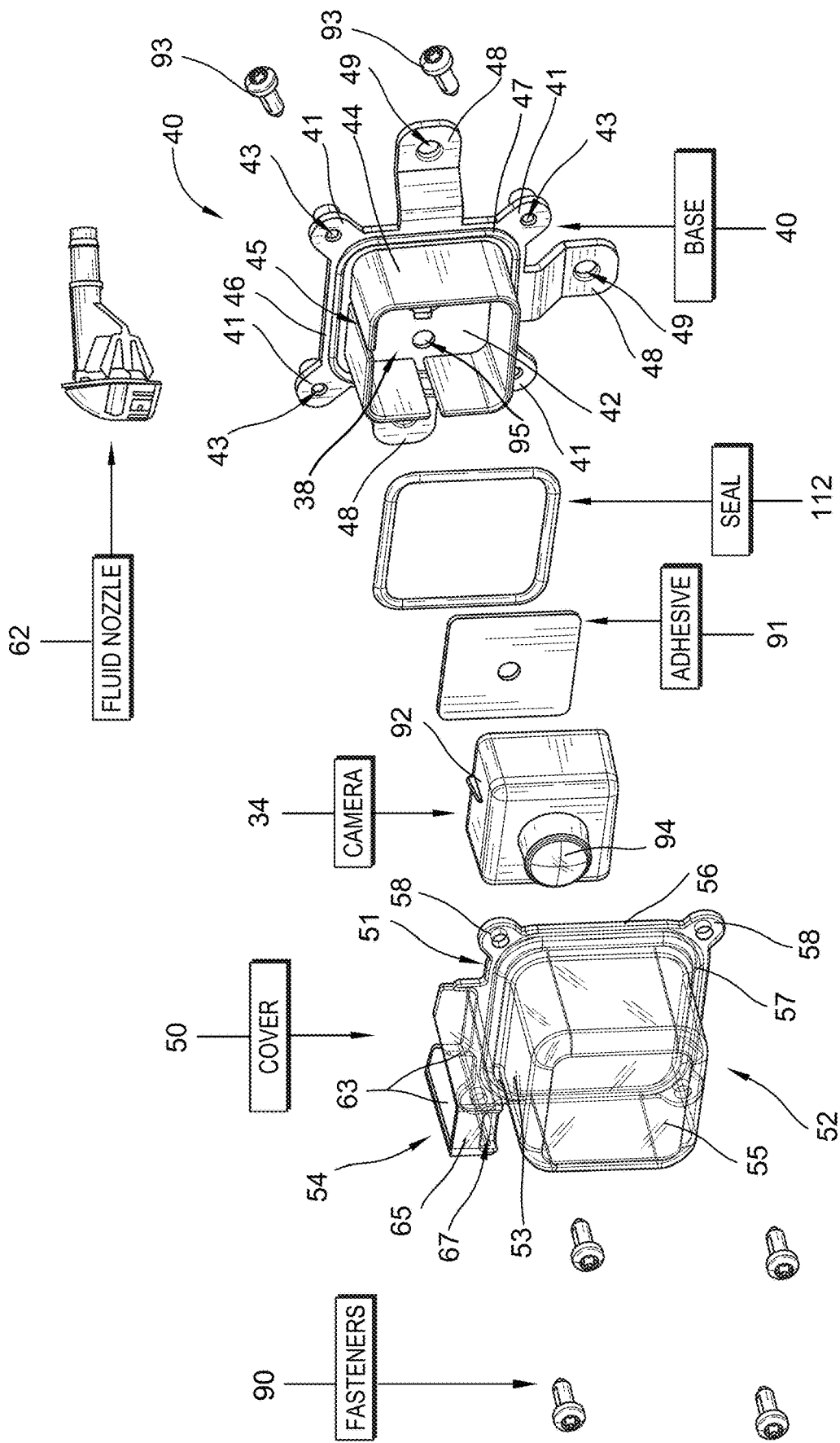
Figure 4:
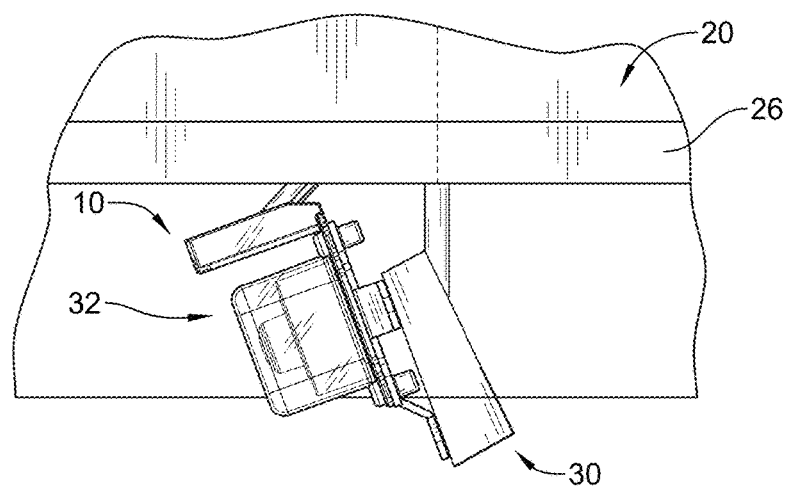
Figure 5:
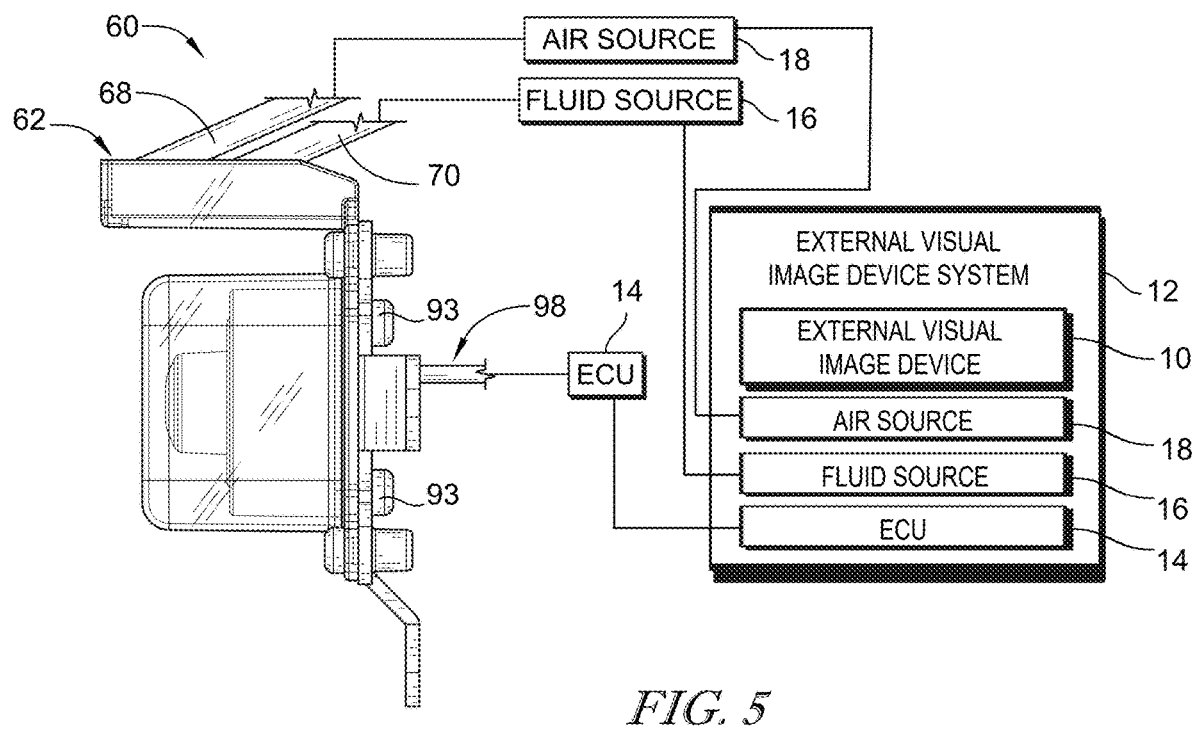

FIG. 3 is an exploded assembly view of the external visual image device showing, that the housing includes the cover and the base, the cover forming a nozzle support and an enclosure with a cover flange surrounding a perimeter of the cover, the base including at least one mounting flange and a plate with protruding sidewalls defining an attachment flange around a perimeter of the plate, and showing the external visual image devise further includes a seal disposed between the attachment flange and the cover flange, the camera, a fluid nozzle arranged to couple to the nozzle support of the cover, and a plurality of fasteners;

FIG. 4 is a side elevation and view of a portion of the vehicle showing the external visual image device mounted to the underbody of the vehicle, and the camera and fluid nozzle connected to respective systems of the vehicle;

FIG. 5 is a side elevation view of the external visual image device fully assembled with the camera connected to an electronic control unit of the vehicle, and the fluid nozzle connected to an air source and fluid source of the vehicle;

FIG. 6 is a perspective view of the external visual image device showing the housing assembled with the camera disposed between the base and the cover of the housing;

FIG. 7 is a front view of the external visual image device of FIG. 6; and

FIG. 8 is a side view of the external visual image device of FIG. 6.

DETAILED DESCRIPTION

Figure 1:
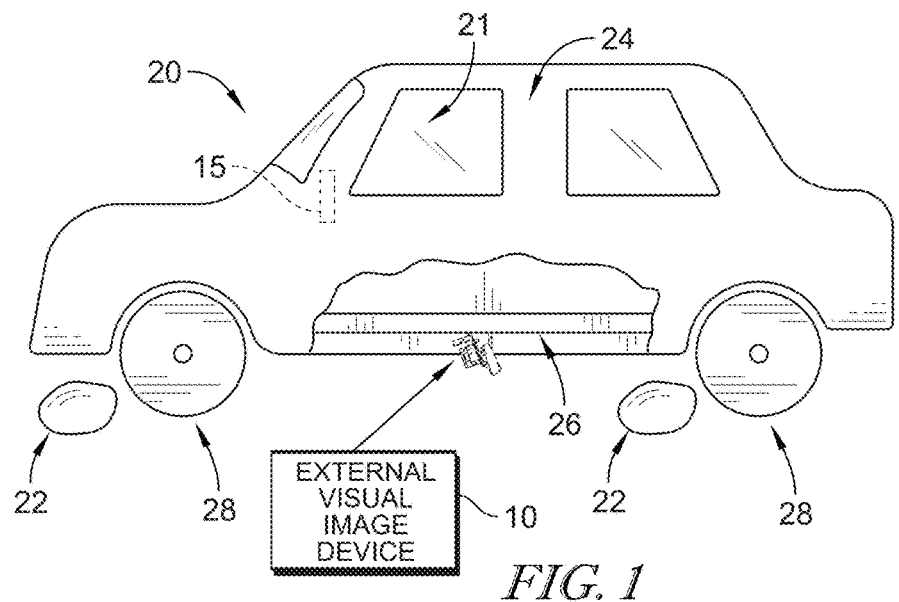
FIG. 1 is a side elevation view of a vehicle including a vehicle body, a vehicle frame and a plurality of wheels and showing an external visual image device, in accordance with the present disclosure, coupled to the vehicle and arranged to lie beneath the vehicle frame and within a wheelbase to observe one or more obstructions relative to the wheels of the vehicle.

An external visual image device 10 in accordance with the present disclosure is adapted to be coupled to a vehicle 20 to view obstacles 22 under and around the vehicle 20 and not visible to an operator of the vehicle 20 as shown in FIG. 1. The external visual image device 10 is located beneath a vehicle body 24 of the vehicle 20 and is arranged to lie within a wheelbase of the vehicle 20. The external visual image device 10 may be coupled to one or more vehicle sub-systems to provide an external visual image device system 12 including the external visual image device 10 as shown in FIG. 5. In other embodiments, the external visual image device 10 may be coupled to other areas of the vehicle 20.

Figure 2:
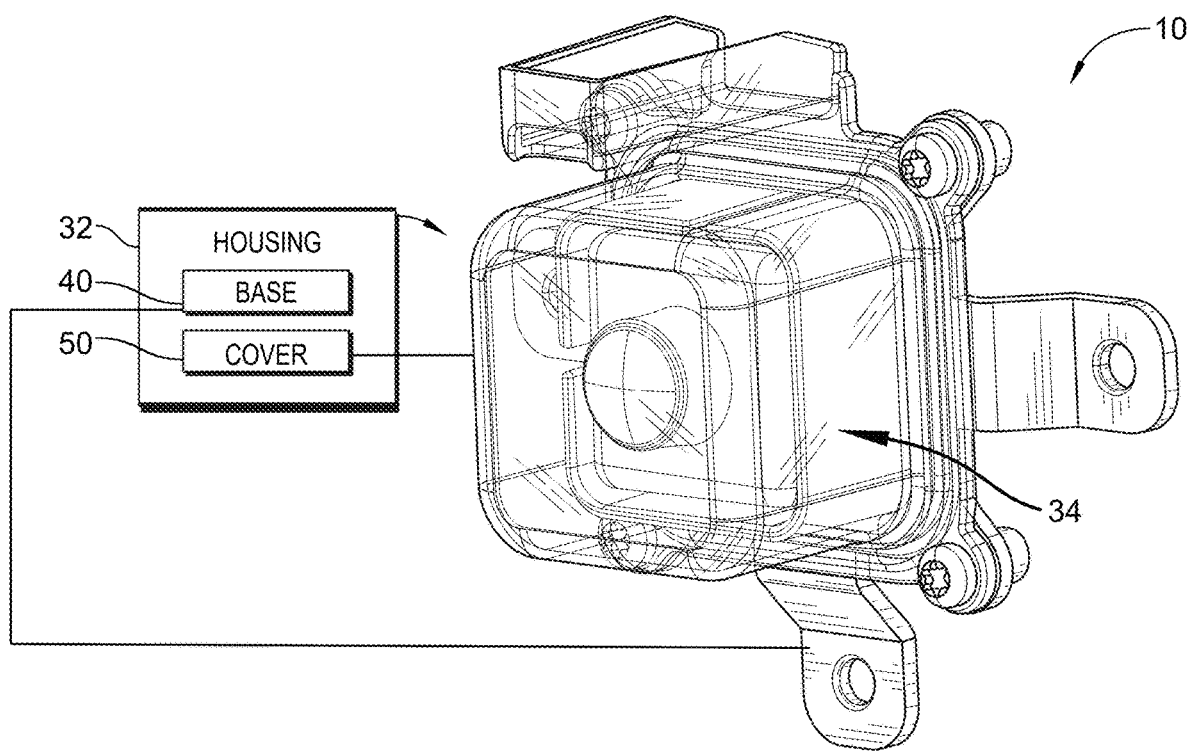
FIG. 2 is a perspective view of the external visual image device from FIG. 1 showing that the external visual image device includes a housing having a base and a cover coupled to the base, and a camera located within an internal compartment formed by the base of the housing and enclosed by the cover.

As shown in FIG. 2, the external visual image device 10 includes a housing 32 covering a camera 34. The housing 32 includes a base 40 and a replaceable cover 50. The cover 50 is configured to be easily removable from the external visual image device 10 such that the cover 50 can be removed and replaced if it becomes damaged by the elements or debris without needing to remove the entire housing 32 or external visual image device 10 from the vehicle 20.

As shown in FIG. 5, The external visual image device system 12 may further include an electronic control unit (ECU) 14, a fluid source or reservoir 16, and/or an air source 18, each of which is included in the vehicle 20. The ECU 14 receives electronic signals and data from the external visual image device 10 and is configured to display images captured by the external visual image device 10 on a screen 15 located in a cabin 21 of the vehicle 20, for example. The fluid source 16 and air source 18 are used by the external visual image device 10 to provide a lens-cleaning system 60 to clean portions of the external visual image device 10 so that the images captured and displayed on the screen 15 are clear for the operator of the vehicle 20.

Referring back to FIG. 1, the vehicle 20 may be any land vehicle having portions that are not visible to the operator within the cabin 21 such as an underbody of the vehicle 20. The vehicle 20 includes a vehicle body 24, a vehicle frame 26, and a plurality of wheels 28. The vehicle body 24 defines the cabin 21 of the vehicle 20 and supports one or more occupants and the operator for transport by the vehicle 20. The vehicle frame 26 includes structural components of the vehicle 20 such as a vehicle chassis, for example, and is configured to support the vehicle body 24. The plurality of wheels 28 are coupled to the vehicle frame 26 and support the vehicle body 24 and the vehicle frame 26 above ground to allow the vehicle 20 to travel over the ground.

The ground that the vehicle 20 travels over may include obstacles 22, such as rocks, which could damage portions of the vehicle 20 if the operator fails to avoid the obstacles 22. In some instances, the obstacles 22 are located in areas relative to the vehicle 20 not visible to the operator as shown in FIG. 1. The external visual image device 10 is configured to capture images of areas not visible to the operator (i.e. around wheels 28) to aid the operator in maneuvering the vehicle 20 to avoid the obstacles 22.

The external visual image device 10 is coupled to at least one of the vehicle body 24 and the vehicle frame 26 via a mounting bracket 30. The external visual image device 10 includes a housing 32 and a camera 34 as shown in FIGS. 2 and 3. In some embodiments, the external visual image device 10 includes one or more fasteners, seals, and/or other assembly components. In the illustrated embodiments, the mounting bracket 30 mounts the external visual image device 10 to the vehicle 20, as shown in FIG. 4. Illustratively, the external visual image device 10 is retained to the vehicle frame 26 and has a view area toward the front wheels 28 of the vehicle 20. In some embodiments, the external visual image device 10 view area may be directed toward the rear wheels 28 or may be adjustable to any and all orientations relative to the vehicle 20. The housing 32 is coupled to the mounting bracket 30 via the base 40. The camera 34 is coupled to the base 40 of the housing 32 and is contained within an interior compartment 38 formed by the housing 32. As will be explained in detail below, the camera 34 is easily serviceable due to the arrangement of the components included in the housing 32.

The housing 32 is configured to protect the camera 34 from debris, weather. As shown in FIG. 3, the housing 32 includes the cover 50 and the base 40 configured to couple to the cover 50. The cover 50 and the base 40 cooperate to define the interior compartment 38 that contains and protects the camera 34. In the illustrative embodiment, the base 40 is coupled to the mounting bracket 30. The camera 34 is arranged to lie within the interior compartment 38 between the cover 50 and the base 40. In the illustrative embodiment, the housing 32 further includes a seal 112 disposed between the cover 50 and the base 40 to provide a waterproof seal around the interior compartment 38. In other embodiments, multiple seals may be used.

In the illustrative embodiment, the base 40 is substantially square in shape, but in other embodiments, the base 40 made be any suitable shape to couple to the cover 50 and enclose the camera 34. The base 40 includes a plate 42 and is shaped to form base sidewalls 44 that at least partially define the interior compartment 38, an attachment flange 46, and at least one mounting surface 48. The plate 42 forms a rear surface of the base 40 on to which the camera 34 is coupled. On one side of the plate 42, the base sidewalls 44 extend outward from the plate 42. In the illustrative embodiment, the base sidewalls 44 extend substantially perpendicular to the plate 42, and extend around the plate to form an outer perimeter of the interior compartment 38. One or more slots 45 may be formed in or between the base sidewalls 44. In the illustrative embodiment, the slot 45 extend through an entire thickness of the base sidewall 44 and along a full length and/or height of the base sidewall 44. In alternative embodiments, the slot 45 may only partially extend through the base sidewall 44.

The base sidewalls 44 are spaced apart from an outer perimeter of the plate 42, defining the attachment flange 46 between the base sidewalls 44 and the outer perimeter or edge of the plate 42. In the illustrative embodiment, the attachment flange 46 is the portion of the plate 42 between the outer perimeter of the plate 42 and the base sidewalls 44. In the illustrative embodiment, the attachment flange 46 is shaped to form a recess 47 in the surface of the plate facing the base sidewalls 44, the recess 47 extending around a perimeter of the base sidewalls 44. In the illustrative embodiment, the recess 47 is shaped to receive the seal 112.

The attachment flange 46 is shaped to define one or more attachment tabs 41. The attachment tabs 41 may extend out from the plate 42 such that the attachment tabs 41 are flush with the attachment flange 46 and the plate 42. The attachment tabs 41 may be disposed anywhere along the attachment flange 46. In the illustrative embodiment, the attachment tabs 41 are located at each corner of the plate 42 of the base 40. In alternative embodiments, the attachment tabs 41 may be disposed at only certain corners of the plate 42 and/or along the sides of the plate 42 between corners. The attachment tabs 41 are each shaped to form an attachment hole 43, for example, a screw hole 43 in the illustrative embodiment, shaped to receive a fastener 90 for coupling the cover 50 to the base 40. In the illustrative embodiment, the base 40 is attached to the cover 50 by a plurality of fasteners 90.

In the illustrative embodiment, the mounting surface 48 is shown as a mounting flange 48. In other embodiments, the mounting surface 48 comprises at least a portion of the base 40, for example, at least a portion of the base plate 42. In some embodiments, the base 40 may be directly welded to the vehicle 20 or coupled to the vehicle with, for example, a weldnut at the mounting surface 48.

In the illustrative embodiment, the mounting flanges 48 extend outward from the attachment flange 46 and the plate 42. In the illustrative embodiment, the mounting flanges 48 extend outward from the plate 42 and down or away from the plate 42, such that an end of the mounting flange 48 opposite the end connected to the plate 42 is offset from the plate 42, extending in an opposite direction from that plate 42 than the base sidewalls 44. The mounting flanges 48 are each shaped to form an attachment hole 49, for example, a screw hole 49 in the illustrative embodiment, shaped to receive a fastener for coupling the base 40 to the mounting bracket 30. In the illustrative embodiment, the mounting flanges 48 are disposed in between the attachment tabs 41, such that the mounting flanges 48 and the attachment tabs 41 are offset from each other to allow independent access to the fasteners 90 extending through the attachment tabs 41 while the mounting flanges 48 may remain coupled to the mounting bracket 30.

In the illustrative embodiment, the camera 34 is fixed to the plate 42 within the interior compartment 38 by an adhesive 91. In the some embodiments, the adhesive 91 is one or more pieces of adhesive, such as a double-sided tape adhesive. In other embodiments, the adhesive 91 is glue. In the illustrative embodiment, the camera 34 is fixed to the plate 42 within the interior compartment 38 by one or more fasteners 93. In the illustrative embodiment, the fastener 93 is a screw or bolt that extends through an aperture 95 in the plate 42 to couple the camera 34 to the plate 42. In other embodiments, the fastener 93 may be a clip or any other suitable type of fastener 93 that extends through the aperture 95 in the plate 42 to couple the camera 34 to the plate 42. In some embodiments, the camera 34 is fixed to the plate with the adhesive 91 and without any fasteners 93. In some embodiments, the camera 34 is fixed to the plate with one or more fasteners 93 and without any adhesive 91. In some embodiments a combination of different attachment schemes may be used to couple the camera 34 to the plate 42, for example, both an adhesive 91 and a fastener 93.

The camera 34 includes a camera head 92 that captures image data, a camera lens 94 coupled to the camera head 92. The camera 34 may include any other suitable components for capturing and conveying image data. The camera 34 further includes a connector 98 that extends between the camera head 92 and the ECU 14 to transmit the image data over a wired connection. In the illustrative embodiment, the connector 98 extends through an aperture formed in the plate 42 In other embodiments, the camera head 92 may include one or more transceivers and/or antennas to transmit the image data over a wireless connection to the ECU 14. In some embodiments, the connector 98 may be a coaxial cable connector or other suitable visual image connector. In some embodiments, the connector 98 is capable of carrying power and/or other signals in addition to visual images.

The cover 50 of the housing is configured to enclose the interior compartment 38 to protect the camera 34 from debris, elements, and moisture. The cover 50 is shaped to form an enclosure 52, a nozzle support 54, and a cover flange 56. The enclosure 52 fits over and at least partially defines the interior compartment 38. In the illustrative embodiment, the enclosure 52 is substantially square or cube in shape, but in other embodiments made be any suitable shape to couple to the base 40 and enclose the camera 34. The enclosure 52 includes cover sidewalls 53 and a front surface 55. The cover sidewalls 53 project outwards from a base 51 of the cover 50, substantially parallel to the base 51. In the illustrative embodiment, the cover sidewalls 53 of the cover 50 are arranged to fit over the base sidewalls 44 of the base 40. When the housing 32 is assembled, the cover sidewalls 53 are spaced apart and extend substantially parallel to the base sidewalls 44 when the cover 50 is coupled to the base 40.

The front surface 55 extends between the cover sidewalls 53 at an opposite end of the cover sidewalls 53 from the base 51 of the cover 50. The front surface 55 extends substantially parallel to the plate 42 of the base 40 when the housing 32 is assembled. The front surface 55 is configured to close off and/or cover a front opening of the interior compartment 38 when the cover 50 is installed on the base 40. The front surface 55 may be substantially parallel to the lens 94 of the camera 34. The front surface 55 may cooperate with the camera 34 to bring objects and/or obstacles on the ground into focus to be viewed by the external visual image device system 12.

The cover flange 56 is defined by the base 51 of the cover 50, between an outer perimeter or edge of the cover 50 and the cover sidewalls 53. In the illustrative embodiment, the cover flange 56 is shaped to form a recess 57 extending around a perimeter of the base 51 of the cover 50, between the outer perimeter of the base 51 and the cover sidewalls 53. In the illustrative embodiment, the recess 57 is shape to correspond to a shape of the recess 47 in the base 40, such that the seal 112 fits between the two recesses when the cover 50 is installed on the base 40.

The cover flange 56 is shaped to include cover tabs 58 that extend outward from the cover flange 56 and the base 51 of the cover 50, flush with the cover flange 56. In the illustrative embodiment, a cover tab 58 is disposed at each one of the corners of the cover 50. In other embodiments, the cover tabs 58 may only be disposed at certain corners, or along the sides of the cover flange 56 between corners. In the illustrative embodiment the cover flange 56 and cover tabs 58 are shaped to correspond to and/or generally match a shape of the attachment flange 46 and the attachment tabs 41 of the base 40. In other embodiments, the position and number of cover tabs 58, attachment tabs 41, mounting flanges 48, and/or their respective fasteners may vary and/or may depend on the design needs of the camera 34, the vehicle 20, and/or the mounting bracket 30.

The cover tabs 58 are each shaped to form an attachment hole 59, for example, a screw hole 59 in the illustrative embodiment, shaped to receive the fastener 90 for coupling the cover 50 to the base 40. In the illustrative embodiment, the fasteners 90 are inserted from the direction of the cover 50 and extend first though the fastener holes of the cover 50 and then extend into the fastener holes of the base 40. The assembly direction of the fasteners 90 allows for removal of the cover 50 even if only the front of the housing 32 is accessible and the space behind housing 32 and/or behind the base 40 is not accessible.

In the illustrative embodiment, the nozzle support 54 of the cover 50 extends outward from the base 51 of the cover 50. The nozzle support 54 extends outwards in substantially the same direction as the cover sidewalls 53 of the enclosure 52, parallel to the enclosure 52. In the illustrative embodiment, the nozzle support 54 is generally U-shaped with a platform 61, parallel sidewalls 63 extending out from the platform 61 along the sides of the platform 61, and an endwall 65 extending between the parallel sidewalls 63 at an end of the nozzle support 54 farthest away from the base 51 of the cover 50. The nozzle support 54 is shaped to couple with and support at least one nozzle that directs fluid such as air or water onto the front surface 55 of the cover 50. The platform 61 includes an opening 67 though which fluids are directed from the nozzle 62, through the platform 61, and onto the front surface 55 of the cover 50. Because the nozzle support 54 is integrated with the cover 50, the nozzle support 54 may also be easily replaced or removed if damaged. In alternative embodiments, the nozzle support 54 may be part of the base 40 of the housing 32. In alternative embodiments, there could be no spray nozzle 62 or nozzle support 54 and/or the spray nozzle 62 could be external to the external visual device system 12.

The external visual image device system 12 further comprises a lens-cleaning system 60 configured to clean the front surface 55 of the cover 50 so that the image data captured by the camera 34 is clear. The lens-cleaning system 60 includes a spray nozzle 62 mounted on the nozzle support 54 of the housing 32 and arranged to direct a cleaning fluid toward the front surface 55, and a cleaning-fluid conduit 70 arranged to extend from the fluid source 16 toward the spray nozzle 62 to deliver the cleaning fluid to the spray nozzle 62. The lens-cleaning system 60 may further include a second cleaning fluid conduit 68 configured to supply a second cleaning fluid from the air source 18. The second cleaning fluid provided by the air source 18 is different from the cleaning fluid provided by the fluid source 16. In one example, the cleaning fluid from the fluid source 16 is a liquid and the second cleaning fluid from the air source 18 is a gas. In one embodiment the fluid source 16 is a windshield-wiper fluid reservoir and the air source 18 is a pneumatic pump, such as a pneumatic pump used to inflate and deflate bladders in a vehicle seat of the vehicle 20. In other embodiments, an alternative source may act as the fluid source 16. For example, the fluid source 16 may another fluid available from a system of a vehicle, or the fluid source 16 may be independent and separate from other vehicle systems.

The first cleaning fluid is configured to wash the front surface 55 of the cover 50 while the second cleaning fluid pressurizes the first cleaning fluid exiting the spray nozzle 62. The first cleaning fluid may be shut off while the second clean fluid continues to impact the front surface 55 to dry the front surface 55. The spray nozzle 62 is coupled to nozzle support 54 the cover 50 for movement therewith and relative thereto.

The arrangement of all of the components of the external visual image device 10 allows the camera 34 or other components such as the cover 50 to be easily serviced. For example, the housing 32 may be removed from the cleaning system 60 and the mounting bracket 30 by removing fasteners extending through the mounting flanges 48 of the base 40. The cover 50 may be separated from the base 40 by removing the fasteners 90 extending through the cover flange 56 and the attachment flange 46. The camera 34 may be separated from the housing 32 by removing the camera 34 from the adhesive 91 and the interior compartment 38. If the cover 50 is damaged, a new cover can replace the damaged cover 50. The external visual image device 10 can similarly be easily reassembled by replacing the removed components and fasteners.

The present disclosure allows for the camera 34 to be easily serviced. The design of the cover 50 of the housing 32 helps the user with easy serviceability. The housing 32 includes a design such that cover 50 is installed from the front, opposite from the mounting bracket 30, so that the cover 50 can be removed while the base 40 and/or camera 34 is still attached to the vehicle 20.

The components of the external visual device 10 may differ or vary based on the shape, geometry, and/or system requirements of the vehicle 20 and/or camera 34. For example, the connector 98 may vary based on ECU 14 and/or the systems of the vehicle 20 to be compatible with the vehicle systems. Additionally or alternatively, a shape, number, and/or design of the mounting flanges 48 of the base 40 and/or of the mounting bracket 30 may vary based on the underbody design of the vehicle frame 26. Additionally or alternatively, the housing 32 of the external visual device 10 may vary to be compatible with a fit a specific design of camera 34, or vary to accommodate a variety of types of cameras 34.

The following numbered clauses include embodiments that are contemplated and non-limiting:

Clause 1. An external visual image device adapted to be mounted to a vehicle to capture image data beneath the vehicle, the external visual image device including a housing coupled to the vehicle via at least one mounting surface.

Clause 2. The external visual image device of clause 1, any other clause, or any combination of clauses, wherein the housing includes a base and a cover.

Clause 3. The external visual image device of clause 2, any other clause, or any combination of clauses, wherein the base is shaped to form the at least one mounting surface, an attachment flange, and base sidewalls defining an interior compartment.

Clause 4. The external visual image device of clause 3, any other clause, or any combination of clauses, wherein the cover is shaped to enclose the interior compartment and cover a front opening of the interior compartment, the cover shaped to form a cover flange arranged to couple to the attachment flange of the base.

Clause 5. The external visual image device of clause 4, any other clause, or any combination of clauses, further including a camera coupled to the housing and arranged to lie within the interior compartment between the cover and the base.

Clause 6. The external visual image device of clause 5, any other clause, or any combination of clauses, wherein the base includes a plate forming a rear surface of the interior compartment, the camera coupled to a surface of the plate.

Clause 7. The external visual image device of clause 6, any other clause, or any combination of clauses, wherein the at least one mounting surface comprises a mounting flange, the mounting flange extending out and away from the plate in an opposite direction from the base sidewalls.

Clause 8. The external visual image device of clause 6, any other clause, or any combination of clauses, wherein the camera is coupled to the plate with an adhesive.

Clause 9. The external visual image device of clause 6, any other clause, or any combination of clauses, wherein the camera is coupled to the plate with a fastener.

Clause 10. The external visual image device of clause 5, any other clause, or any combination of clauses, wherein the base sidewalls extend away from the plate, at least partially enclosing the interior compartment, the plate extending past a perimeter of the interior compartment formed by the base sidewalls to define the attachment flange extending around a perimeter of the base.

Clause 11. The external visual image device of clause 10, any other clause, or any combination of clauses, wherein the attachment flange is shaped to form at least one attachment tab, the at least one attachment tab disposed at a corner of the plate.

Clause 12. The external visual image device of clause 11, any other clause, or any combination of clauses, wherein the attachment flange is shaped to form a plurality of attachment tabs, each of the plurality of attachment tabs disposed at a different corner of the plate.

Clause 13. The external visual image device of clause 11, any other clause, or any combination of clauses, wherein the at least one attachment tab is offset from the at least one mounting surface.

Clause 14. The external visual image device of clause 11, any other clause, or any combination of clauses, wherein the cover flange extends around the perimeter of the cover to mate with the attachment flange, the cover flange shaped to form at least one cover tab disposed at a corner of the cover flange to couple to the at least one attachment tab of the base.

Clause 15. The external visual image device of clause 14, any other clause, or any combination of clauses, wherein the attachment flange is shaped to form a first recess extending around the interior compartment between the base sidewalls and a perimeter of the attachment flange.

Clause 16. The external visual image device of clause 15, any other clause, or any combination of clauses, wherein the cover flange is shaped to form a second recess extending around the base of the cover.

Clause 17. The external visual image device of clause 16, any other clause, or any combination of clauses, the housing further comprising a seal to fit between the first recess of the attachment flange and the second recess of the cover flange to form a waterproof seal between the base and the cover around the interior compartment.

Clause 18. The external visual image device of clause 5, any other clause, or any combination of clauses, wherein the cover further comprises an enclosure having cover sidewalls extending out from the cover flange and a front surface extending between the cover sidewalls at an opposite end of the cover sidewalls, the front surface and the cover flange offset in parallel planes connected by the cover sidewalls.

Clause 19. The external visual image device of clause 5, any other clause, or any combination of clauses, wherein the base is shaped to form a slot in the base sidewalls, the slot extending along a height of the base sidewalls.

Clause 20. The external visual image device of clause 5, any other clause, or any combination of clauses, wherein the cover further comprises a nozzle support configured to couple to a fluid nozzle, the nozzle support arranged to direct a fluid from a fluid source onto the cover.

Clause 21. A housing for an external visual image device adapted to be mounted to a vehicle to capture image data beneath the vehicle, the housing comprising a base including a plate shaped to form an attachment flange.

Clause 22. The housing of clause 21, any other clause, or any combination of clauses, wherein the base further shaped to form a plurality of base sidewalls projecting out from a surface of the plate and shaped to form an interior compartment.

Clause 23. The housing of clause 22, any other clause, or any combination of clauses, wherein the base further shaped to form at least one mounting surface extending out from the base and extending in a direction opposite from the base sidewalls.

Clause 24. The housing of clause 23, any other clause, or any combination of clauses, further including a cover shaped to form a cover flange and an enclosure.

Clause 25. The housing of clause 24, any other clause, or any combination of clauses, wherein the enclosure has cover sidewalls and a front surface extending between the cover sidewalls, the enclosure arranged to enclose the interior compartment of the base and cover a front opening of the interior compartment, the cover flange arranged to couple to the attachment flange of the base.

Clause 26. The housing of clause 25, any other clause, or any combination of clauses, wherein the attachment flange is shaped to form a first recess extending around the interior compartment and the cover flange is shaped to form a second recess extending around a base of the enclosure, the housing further comprising a seal to fit between the first recess and the second recess to form a water tight seal between the base and the cover around the interior compartment.

Clause 27. The housing of clause 25, any other clause, or any combination of clauses, wherein the attachment flange is shaped to form at least one attachment tab, the at least one attachment tab is offset from the at least one mounting surface, and the cover flange shaped to form at least one cover tab disposed along a perimeter of the cover flange to couple to the at least one attachment tab of the base.

Clause 28. A housing for an external visual image device, the housing including a base comprising a plate shaped to form an attachment flange, a plurality of base sidewalls projecting out from a surface of the plate and shaped to form an interior compartment, and at least one mounting surface extending out from the base and extending in a direction opposite from the base sidewalls.

Clause 29. The housing of clause 28, any other clause, or any combination of clauses, further including a cover shaped to form a cover flange and an enclosure having cover sidewalls and a front surface extending between the cover sidewalls, the enclosure arranged to enclose the interior compartment of the base, the cover flange coupled to the attachment flange of the base.

The invention claimed is:

1. An external visual image device adapted to be mounted to a vehicle to capture image data beneath the vehicle, the external visual image device comprising:
a housing coupled to the vehicle via at least one mounting surface, the housing including a base and a cover, the base shaped to form the at least one mounting surface, an attachment flange, and base sidewalls defining an interior compartment, the cover shaped to enclose the interior compartment and cover a front opening of the interior compartment, the cover shaped to form a cover flange arranged to couple to the attachment flange of the base; and
a camera coupled to the housing and arranged to lie within the interior compartment between the cover and the base.

2. The external visual image device of claim 1, wherein the base includes a plate forming a rear surface of the interior compartment, the camera coupled to a surface of the plate.

3. The external visual image device of claim 2, wherein the at least one mounting surface comprises a mounting flange, the mounting flange extending out and away from the plate in an opposite direction from the base sidewalls.

4. The external visual image device of claim 2, wherein the camera is coupled to the plate with an adhesive.

5. The external visual image device of claim 2, wherein the camera is coupled to the plate with a fastener.

6. The external visual image device of claim 2, wherein the base sidewalls extend away from the plate, at least partially enclosing the interior compartment, the plate extending past a perimeter of the interior compartment formed by the base sidewalls to define the attachment flange extending around a perimeter of the base.

7. The external visual image device of claim 6, wherein the attachment flange is shaped to form at least one attachment tab, the at least one attachment tab disposed at a corner of the plate.

8. The external visual image device of claim 7, wherein the attachment flange is shaped to form a plurality of attachment tabs, each of the plurality of attachment tabs disposed at a different corner of the plate.

9. The external visual image device of claim 7, wherein the at least one attachment tab is offset from the at least one mounting surface.

10. The external visual image device of claim 7, wherein the cover flange extends around the perimeter of the cover to mate with the attachment flange, the cover flange shaped to form at least one cover tab disposed at a corner of the cover flange to couple to the at least one attachment tab of the base.

11. The external visual image device of claim 10, wherein the attachment flange is shaped to form a first recess extending around the interior compartment between the base sidewalls and a perimeter of the attachment flange.

12. The external visual image device of claim 11, wherein the cover flange is shaped to form a second recess extending around the base of the cover.

13. The external visual image device of claim 12, the housing further comprising a seal to fit between the first recess of the attachment flange and the second recess of the cover flange to form a waterproof seal between the base and the cover around the interior compartment.

14. The external visual image device of claim 1, wherein the cover further comprises an enclosure having cover sidewalls extending out from the cover flange and a front surface extending between the cover sidewalls at an opposite end of the cover sidewalls, the front surface and the cover flange offset in parallel planes connected by the cover sidewalls.

15. The external visual image device of claim 1, wherein the base is shaped to form a slot in the base sidewalls, the slot extending along a height of the base sidewalls.

16. The external visual image device of claim 1, wherein the cover further comprises a nozzle support configured to couple to a fluid nozzle, the nozzle support arranged to direct a fluid from a fluid source onto the cover.

\* \* \* \* \*